Dec. 23, 1952  F. B. EVERS  2,622,740
BAKER'S RACK
Filed Oct. 17, 1950  2 SHEETS—SHEET 2
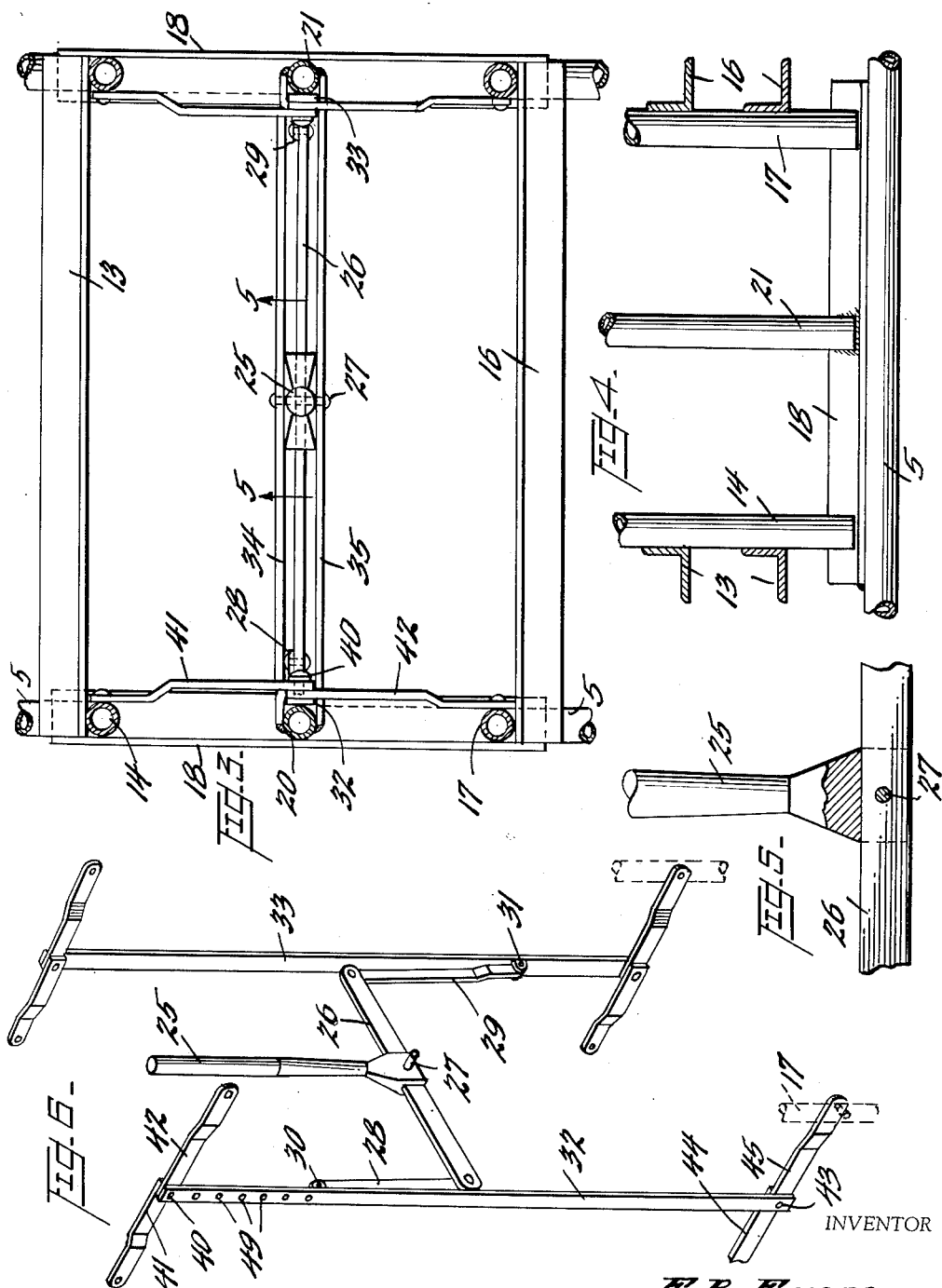
INVENTOR
F. B. Evers,
BY
ATTORNEY Patented Dec. 23, 1952

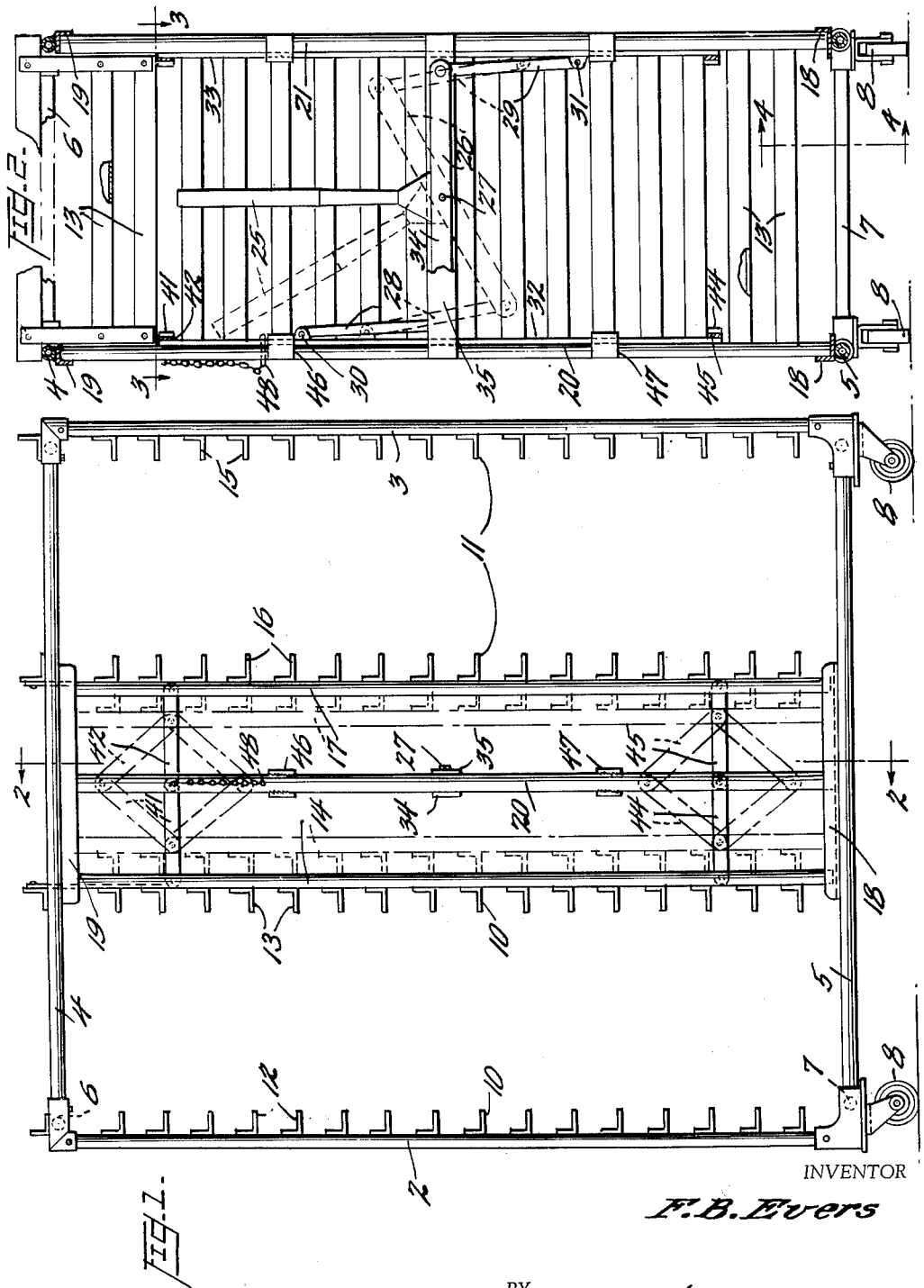

2,622,740

UNITED STATES PATENT OFFICE 2,622,740

BAKER'S RACK

Frank B. Evers, Nashville, Tenn.

Application October 17, 1950, Serial No. 190,602

7 Claims. (Cl. 211—41)

1

This invention relates to racks for baker's pans or trays, having for its object to provide a rack which is adjustable to different sized pans or trays, thereby producing a rack which may be readily and cheaply manufactured and which is more efficient in use than those heretofore proposed.

With these and other objects in view, the invention resides in the novel details of construction and combinations of parts as will be disclosed more fully hereinafter and particularly covered by the claims.

Referring to the accompanying drawings forming a part of this specification and in which like numerals designate like parts in all the views—

Fig. 1 is a front elevational view of a rack made in accordance with this invention;

Fig. 2 is a vertical sectional view taken as on the line 2—2 of Fig. 1 and looking in the direction of the arrows;

Fig. 3 is a horizontal sectional view taken as on the line 3—3 of Fig. 2 and looking in the direction of the arrows;

Fig. 4 is a partial vertical sectional view taken as on the line 4—4 of Fig. 2 and looking in the direction of the arrows;

Fig. 5 is a detailed view to illustrate the bifurcated lower end of the operating handle and its securement to the toggle bar; and Fig. 6 is a perspective view illustrating the toggle or linkage arrangement for adjusting the pan supports.

The principal feature of this invention lies in the ability for a baker to use one rack for a number of sizes of bread, bun, or roll pans. It is an unfortunate fact that stock pans, as supplied by manufacturers, do not have the same width, and in the past it has been necessary for a baker to use a plurality of different racks, each rack made to fit one of several sizes of pans, due to the different widths of said pans. The only alternative has been to use ordinary bread racks which are not constructed for this purpose; however, they contain fewer pans though of longer dimension, and therefore they consume more floor space. A proposed solution to this problem comprised having the pan manufacturer make all of his various bun and roll pans with the same width as his present widest bun pan, but this proved more expensive and did not result in the necessary sturdy construction demanded in a bakery.

The present invention comprises a rack in the nature of an open framework made of metal bars, tubing, or the like, for ready assembly and cheap manufacture. More specifically, the rack comprises vertical corner frame members such as 2 and 3 on one side (front) of the rack and a similar pair of vertical corner frame members on the other side (rear). The upper and lower ends of these front corner frame members are joined respectively by horizontal frame members such as 4 and 5, and a similar construction may be provided on the rear side of the rack. The frame members 2, 3, 4 and 5, as well as the upper and lower horizontal frame members 6 and 7 joining the front and rear of the rack, for convenience and strength, may be made of tubular steel, and the entire framework of the rack may be supported on rollers such as 8.

The racks may be of any desired size to suit the baker's needs, but preferably each rack is made of double capacity in that there is provided one vertical unit of supporting ledges or shelves as indicated at 10, and a parallel vertical unit of similar shelves as indicated at 11, with an appreciable space between the two units at the center of the rack. In each unit, half of the shelves such as 12 are rigidly connected to the stationary vertical corner frame members such as 2, and the remaining and opposite shelves such as 13 are rigidly connected to vertical bars such as 14 which may be moved toward or away from the corner frame members 2 in order to adjust the spacing between the shelves for accommodation of pans of different widths.

In a similar manner half of the shelves such as 15 of the other unit 11 are rigidly carried by the stationary front corner frame members such as 3, with the opposite and remaining shelves such as 16 carried by similar and adjustable vertical bars such as 17. The upper and lower ends of the adjustable bars 14 and 17 are adapted to slide in guideways comprising, for example, channels or angle members such as 19 and 18 rigidly carried by the top and bottom frame members such as 4 and 5. A duplication of this construction is provided for the rear of the framework, and at the center of each of the front angle members 18 and 19 there is welded respectively the bottom and top ends of a stationary bar 20, there being a duplicate vertical stationary bar 21 at the opposite rear side of the rack.

Within the space between the adjustable bars 14 and 17 there is mounted any suitable means for moving said bars toward and away from each other. In the drawings there has been illustrated a simple, practical and very efficient means, of the toggle type, said means being shown in perspective in Fig. 6 wherein an operating lever or handle 25 is bifurcated at its lowermost end to rectangularly fit a main link 26 and secured thereto as by the pin 27, the opposite ends of said main link being pivotally connected to subsidiary links such as 28 and 29, which subsidiary links extend in opposite directions from said main link and are pivotally connected respectively as at 30 and 31 to vertical bars 32 and 33 slidably mounted respectively on the central stationary framing bars 20 and 21. The pivot pin 27 has bearings in a pair of parallel spaced straps 34 and 35 interconnecting and strengthening the central stationary framing bars. That is to say, the rectangular interfitment of the handle and the main link will cause the latter to move about the pivot pin 27 when the handle is oscillated, and the subsidiary link 28 extends upwardly from the main link 26, and the other subsidiary link 29 extends downwardly from the main link, so as to give oppositely directed oscillations or reciprocations to the slide bars 32 and 33 to which they are pivotally attached.

As best seen in Figs. 3 and 6, the slide bars 32 and 33 are substantially of equal vertical extent, and each bar extremity is pivotally connected to a pair of oppositely extending short links which in turn are pivotally connected to the adjustable vertical bars such as 14 and 17. That is to say, the slide bar 32 has its upper end loosely pivoted as at 40 to the pair of short links 41 and 42 which in turn are loosely pivoted respectively to the adjustable bars 14 and 17, and said slide bar 32 has its lower end loosely pivoted as at 43 to the pair of similar short links 44 and 45 which in turn are similarly loosely pivoted respectively to the same adjustable bars 14 and 17. The slide bar 32 operates freely in strap guides 46 and 47 welded to or otherwise rigidly carried by the stationary central frame member 20, and a locking pin 48 extending through a hole formed in said central frame member is caused to engage one of a series of spaced holes 49 formed in the slide bar to secure said slide bar in the position to which it has been moved by operation of the lever 25.

That is to say, said lever is operated to slide the bar 32 upwardly or downwardly in order to move the short links 41, 42, 44 and 45 to positions where the movable shelf-supporting bars 14 and 17 will accommodate pans of a certain width, and then the slide bar is locked in position by the locking pin 48. When the rack is to be used for pans of a different width, the locking pin is withdrawn and the lever 25 operated to obtain the adjustment of bars 14 and 17 to new positions in accordance with the said different pan width, and then the locking pin is utilized to secure the slide bar to the central frame member 20 for holding bars 14 and 17 in their newly adjusted positions.

The other slide bar 33 (at the rear of the rack) has a duplication of the short links, and is operated by the lever 25 simultaneously with but oppositely to the slide bar 32, because the lever 25 is pivoted to the framework midway between said bars 32 and 33.

It is obvious that those skilled in the art may vary the details of construction and arrangements of parts without departing from the spirit of this invention, wherefore it is desired not to be limited to the exact foregoing disclosure except as may be required by the claims.

What is claimed is:

1. A baker's rack comprising an open framework having upright stationary and adjustable members, the adjustable members being disposed intermediate the stationary members, shelves rigidly carried by said members, and pivoted means for moving the adjustable members toward and away from the stationary members in accordance with the width of pans to be supported by said shelves.

2. A baker's rack comprising an open framework having upright stationary and adjustable members, the adjustable members being disposed intermediate the stationary members and having their upper and lower ends slidably confined in guideways, shelves rigidly carried by said members, and pivoted means for moving the adjustable members toward and away from the stationary members in accordance with the width of pans to be supported by said shelves.

3. A baker's rack comprising an open framework having upright stationary and adjustable members, the adjustable members being disposed intermediate the stationary members and having their upper and lower ends slidably confined in guideways rigidly mounted on upper and lower members of the framework, shelves rigidly carried by said members, and pivoted means for moving the adjustable members toward and away from the stationary members in accordance with the width of pans to be supported by said shelves.

4. In a baker's rack, a platform, fixed uprights rising from said platform in spaced parallel relation to one another, a pair of movable uprights disposed in spaced parallel relationship to one another and to said fixed uprights and disposed between the latter, said movable uprights being slidable upon said platform in directions toward or away from the adjacent fixed uprights, toggle means disposed between said movable uprights and connected to the latter, means for actuating said toggle means to slide said movable uprights simultaneously toward or away from their adjacent fixed uprights, means for holding said slidable uprights in fixed relationship with their respective fixed uprights, and shelves secured to adjacent sides of said fixed and movable uprights.

5. In a baker's rack, a platform, fixed uprights rising from said platform in spaced relation to one another, a post affixed to and rising from said platform parallel with and between said uprights, a pair of slidable uprights parallel with and disposed one between each of said fixed uprights and said post, toggle means supported by said post and connected to each of said slidable uprights, means for operating said toggle means, and shelves secured to said fixed and movable uprights.

6. In a baker's rack, a platform, fixed uprights rising from said platform in spaced parallel relation to one another, a post affixed to and rising from said platform parallel with and between said uprights, a pair of slidable uprights parallel with and disposed one between each of said fixed uprights and said post, toggle means supported by said post and connected to each of said slidable uprights, means for operating said toggle means, means for holding said slidable uprights against movement, and shelves secured to said fixed and movable uprights.

7. In a baker's rack, a platform, fixed uprights rising from said platform in spaced relation to one another, a post affixed to and rising from said platform parallel with and between said uprights, a pair of slidable uprights parallel with and disposed one between each of said fixed uprights and said post, toggle means supported by said post and connected to each of said slidable uprights, said toggle means so constructed and arranged as to move said slidable uprights simultaneously toward or away from their adjacent fixed uprights, means whereby said toggle mechanism may be operated, and shelves secured to said fixed and movable uprights.

FRANK B. EVERS.

REFERENCES CITED

The following references are of record in the file of this patent:

UNITED STATES PATENTS

| Number | Name | Date |
|---|---|---|
| 357,609 | Landers | Feb. 15, 1887 |
| 551,403 | Proctor | Dec. 17, 1895 |
| 1,143,668 | Walz | June 22, 1915 |
| 1,355,033 | Cheape | Oct. 5, 1920 |
| 2,088,741 | Hanson | Aug. 3, 1937 |
| 2,425,610 | Finley | Aug. 12, 1947 |